United States Patent Office

3,708,395
Patented Jan. 2, 1973

3,708,395
PROCESS FOR PRODUCING L-LYSINE
Kiyoshi Nakayama, Sagamihara, and Kazumi Araki, Tokyo, Japan, assignors to Kyowa Hakko Kogyo Company, Ltd., Tokyo, Japan
No Drawing. Filed July 13, 1970, Ser. No. 54,639
Claims priority, application Japan, July 23, 1969, 44/57,652
Int. Cl. C12d 13/06
U.S. Cl. 195—29          7 Claims

ABSTRACT OF THE DISCLOSURE

A process for producing L-lysine by fermentation which comprises culturing a microorganism belonging to the genus Brevibacterium flavum or Corynebacterium, glutamicum, the microorganism having a nutritional requirement for homoserine, threonine, threonine plus methionine, leucine, isoleucine or mixtures thereof and a resistance to a feedback inhibition and/or repression of lysine, threonine, isoleucine or analogues thereof, under aerobic conditions in an aqueous nutrient medium. An increase in yield over conventional processes is obtained thereby.

---

This invention relates to a process for producing L-lysine. More particularly, it relates to a process for the production of L-lysine by fermentation. Even more particularly, the invention relates to a process for producing L-lysine by fermentation with particular mutant strains belonging to the genus Brevibacterium flavum or Corynebacterium glutamicum.

The present inventors have previously developed a method for producing L-lysine by fermentation using mutant strains having particular nutritional requirements (Japanese patent publication No. 6,499/1961; "Hakko to Taisha," vol. 2, page 105 (1960)). These mutant microorganism strains have a nutrition requirement for any of homoserine, threonine, threonine plus methionine, leucine or isoleucine and are capable of producing considerable amounts of L-lysine. Since L-lysine is an important substance in the food and medical industries, further improvements in the production thereof by fermentation are continually being sought by those working in the art.

Accordingly, one of the objects of the present invention is to provide an improved process for the production of L-lysine which overcomes the disadvantages and deficiencies of the prior art methods.

Another object of the present invention is to provide a process for producing L-lysine by fermentation which may be carried out in an efficacious and relatively simple manner.

A further object of the invention is to provide a process for producing L-lysine by fermentations which may be carried out advantageously on an industrial scale at low cost to give a high yield of product.

A still further object of the invention is to provide L-lysine.

These and other objects and advantages of the present invention will become apparent to those skilled in the art from a consideration of the following specification and claims.

In accordance with the present invention, it has been found that microorganisms of Brevibacterium flavum having a requirement for threonine and a resistance to a feedback inhibition and/or repression of lysine, thereonine or an analogue thereof, or of Corynebacterium glutamicum having a requirement for homoserine (or threonine plus methionine) and leucine and a resistance to a feedback inhibition and/or repression of lysine, threonine, isoleucine or an analogue thereof, can form and accumulate considerable amounts of L-lysine during the course of fermentation, as compared with the amounts obtained with conventional nutrient-requiring microorganisms.

An advantage of the present invention over the conventional methods used in the art is an increase in the yield of L-lysine. In fact, the increase in yield is greater than 10% over the yield of L-lysine obtained by means of the conventional fermentation processes. This is very advantageous from an industrial point of view.

Another advantage of the present invention is that the L-lysine productivity is resistant to fluctuations in the amount of threonine and other nutrients used in the medium, as is shown in Example 1 hereinbelow.

The process of the invention is of particular advantage over conventional processes when low cost natural raw materials, such as molasses and hydrolysates of natural protein starting materials, are used as a source of supply for the nutritionally required substances. This is because, as is known in the art, the amounts of threonine, isoleucine, etc. in the nutrient medium cause a very great influence upon the yield of L-lysine in processes using the conventional nutrient-requiring microorganisms. If the amount of the threonine and the like becomes excessive, the yield of L-lysine is remarkably reduced, while other required amino acids are still present in insufficient amounts even if protein raw materials containing excess quantities of threonine are used. This is one of the major difficulties of the conventional prior art processes. In the present invention, these difficulties are overcome.

As noted above, the microorganisms used in the present invention are strains of Brevibacterium flavum having a requirement for threonine and a resistance to a feedback inhibition and/or repression of lysine, threonine or an analogue thereof, or of Corynebacterium glutamicum having a requirement for homoserine (or threonine plus methionine) and leucine and a resistance to a feedback inhibition and/or repression of lysine, threonine, isoleucine or an analogue thereof.

It is to be understood that the expression "requirement for threonine" and "requirement for homoserine (or threonine plus methionine )and leucine" used herein has a broad meaning and is intended to cover incomplete, defective strains such as the so-called "leaky" type and, of course, includes strains which satisfy the nutritional requirements with these amino acid precursors.

In addition to the above nutrient requirements, the microorganisms employed for producing L-lysine in accordance with the invention are strains whose lysine biosynthesis system is resistant to the feedback inhibition and/or the repression of lysine, threonine, isoleucine or mixtures thereof.

A procedure for obtaining strains having the first nutrient requirement, i.e., requiring homoserine, threonine, threonine plus methionine, leucine or isoleucine, is known in the art, and such strains can be obtained by a sorting operation based on mutation treatment and nutrient requirement steps or by natural selection. The microorganism strains used in the present invention, which further have the second property of being resistant to the feedback inhibition and/or the repression of lysine, threonine and/or isoleucine, can be obtained by mutation treatment of any of the said nutrient requiring strains belonging to said genera, as strains which have been made resistant to the growth-inhibiting action of (a) lysine or lysine analogues, such as S-(β-aminoethyl)-cysteine, 5-hydroxylysine, 2,6-diaminoheptanoic acid, N-ε-formyllysine, trans-2,6-diamino-4-hexenoic acid, 2,6-diaminohexynoic acid, 2-amino-(β-aminoethoxy)-propionic acid, 3-aminocyclohexane alanine, 4-azalysine, 3-aminomethylcyclohexane glycine, (b) threonine or threonine analogues, such as α-amino-β-hydroxyvaleric acid, β-hydroxyleucine, norleucine, etc., (c) isoleucine or isoleucine analogues, such as 2-amino-3-methylthiobutyric acid, α-aminobutyric acid, L-O-methylthreonine, ε-dehydroisoleucine, 3-cyclopentane-1-glycine, cyclopentane glycine, 2-cyclopentane-1-glycine, β-hydroxyleucine, methallyl glycine, etc., or (d) mixtures of these compounds. These strains can also be obtained by natural selection or by artificial mutation.

In addition to the selection procedure using these compounds, the present strains can be isolated as prototrophic-type strains obtained by backmutation of mutant strains deficient in an enzyme in the lysine biosynthesis route. Strains whose L-lysine formation is remarkably more improved than that of the strains having only a nutritional requirement are used in the present invention by culturing and selection of the strains obtained by such treatment.

Specific exemplary experimental procedures for obtaining such strains are set out immediately hereunder, without intending to limit the present invention thereto, referring to the cases of mutant strains of *Corynebacterium glutamicum* (*Micrococcus glutamicus*: Japanese plant publication No. 8,398/1957) and *Brevibacterium flavum*.

Experiment 1

This experiment illustrates a procedure for obtaining a strain of *Corynebacterium glutamicum* having a requirement for homoserine (or threonine plus methionine) and leucine and which has a resistance to a feedback inhibition action of lysine and threonine.

The strain *Corynebacterium glutamicum* ATCC 13287, having a nutritional requirement for homoserine (or threonine plus methionine) was obtained by ultraviolet ray irradiation and selection of *Corynebacterium glutamicum* ATCC 13032. A mutant strain *Corynebacterium glutamicum* ATCC 21253, having a requirement for both homoserine and leucine, was obtained by a further mutation treatment and selection of the thus-obtained strain. A mutation treatment (nitrosoguanidine treatment) was applied to a suspension containing cells of the latter strain, and then the microorganism was inoculated in an agar flat plate containing a minimum medium supplemented with 1,000 μg./ml. of threonine, 10 μg./ml. of methionine, 20 μ/ml. of leucine and 8 mg./ml. of S-(β-aminoethyl)-cysteine. The grown colonies were separated. The thus-obtained strain had a remarkably improved capability for producing L-lysine, as compared with *Corynebacterium glutamicum* ATCC 21253. The typical strain thereof was named No. "BL–25."

Experiment 2

The following procedure was employed to obtain a strain of *Brevibacterium flavum* having a requirement for threonine and a resistance to a feedback inhibition of lysine and threonine.

A threonine-requiring strain *Brevibacterium flavum* KY 10171 was obtained by mutation treatment of *Brevibacterium flavum* ATCC 14067. A mutation treatment (nitrosoguanidine treatment) was applied to a suspension of the cells of said strain, and then the strains were inoculated in an agar flat plate containing a minimum medium supplemented with 1,000 μg./ml. of threonine, 20 μg./ml. of methionine, 2 mg./ml. of S-(β-aminoethyl)-cysteine and 2 mg./ml. of α-amino-β-hydroxyvaleric acid. The grown colonies were separated. The thus-obtained strain had a considerably improved capability of producing lysine, as compared with *Brevibacterium flavum* KY 10171. The typical strain thereof was called "LT–1."

As for the composition of the fermentation medium and the method of culturing, conventional procedures used for amino acid fermentations are employed and media usually used in the conventional amino acid fermentations as well as the well known media for the production of lysine by fermentation are quite suitable. Thus, either a synthetic culture medium or a natural nutrient medium is suitable for cultivation of the strains employed in the present invention as long as it contains the essential nutrient for the growth of the strain employed. Such nutrients are well known in the art and include substances such as a carbon source, a nitrogen source, inorganic compounds and the like which are utilized by the microorganism employed in appropriate amounts.

Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, fumaric acid, etc., or alcohols, for example, methanol, ethanol and the like. These substances may be used either singly or in mixtures of two or more.

Depending upon the assimilability of the microorganism employed, it is possible to use hydrocarbons in major or mintor amount in the fermentation medium as the source of carbon. Suitable hydrocarbons include straight- and branched-chain paraffins (alkanes), cycloparaffins, straight- and branched-chain olefins, cycloolefins, aromatic hydrocarbons such as benzene, o-xylene, etc. and mixtures thereof and mixed hydrocarbons, for example, those derived from petroleum such as kerosene, light oils, heavy oils, paraffin oils, petroleum crudes, etc.

As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, fish meal, peptone, bouillon, casein hydrolysates, fish solubles, rice bran extract, etc. may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, sodium chloride, etc.

Moreover, it may also be necessary to add certain essential nutrients to the culture medium, depending upon the particular nutritional needs of the microorganism employed, such as particular amino acids as noted above, and/or vitamins, for example, biotin, thiamine, cobalamin and the like.

One important factor is to limit the amount of required amino acid to less than the optimum concentration for the growth of the microorganism strain, a technique quite generally employed in amino acid fermentations.

The fermentation or culturing of the microorganisms is conducted under aerobic conditions, such as aerobic shaking of the culture or with agitation and aeration of a submerged culture, at a temperature of, for example, about 20° to 40° C. and at a pH of, for example, about 4.5 to 9.5. After about 1 to 8 days of culturing under these conditions, large amounts of L-lysine are found to be accumulated in the resultant culture liquor.

After the completion of culturing, the L-lysine can be recovered by conventional means, such as ion exchange resin treatment, extraction with solvents, precipitation, adsorption, chromatography or the like. An exemplary preferred recovery technique comprises the following steps. The culture liquor is adjusted to pH 2 with hydrochloric acid, and the L-lysine is adsorbed on a strongly acidic ion exchange resin adjusted to an ammonia form, being eluted with aqueous ammonia. After the removal of the ammonia, crude crystals of L-lysine hydrochloride can be obtained by adjusting the solution to pH 5–6 with hydrochloric acid and concentrating and cooling the same. Purified crystals are then obtained by treatment with activated carbon, by recrystallization or by other suitable means.

The following examples are given merely as illustrative of the present invention and are not to be considered as limiting. Unless otherwise noted, the percentages therein and throughout the application are by weight per liter of water.

EXAMPLE 1

*Corynebacterium glutamicum* BL–25 ATCC 21526, a strain having a requirement for homoserine and leucine and a resistance to the lysine analogue, S-(β-aminoethyl)-cysteine, is used as the seed strain. The strain is cultured at 30° C. for 24 hours with aerobic shaking in a seed medium having a composition of 4% glucose, 2% polypeptone, 0.15% $KH_2PO_4$, 0.05% $K_2HPO_4$, 0.05%

$$MgSO_4 \cdot 7H_2O$$

50 μg./l. of biotin, 0.3% urea and 0.5% yeast extract. The medium has a pH of 7.2.

Then, 1 ml. of the resultant seed culture is inoculated into a 250 ml. conical flask containing 20 ml. of a fermentation medium having the following composition:

| | Percent |
|---|---|
| Molasses (calculated as glucose) | 10 |
| Soybean cake sulfuric acid decomposate (calculated in terms of soybean cake before decomposition) | 2 |
| $KH_2PO_4$ | 0.07 |
| $MgSO_4 \cdot 7H_2O$ | 0.05 |
| Urea | 0.3 |
| $(NH_4)_2SO_4$ | 0.5 |
| $CaCO_3$ | 3 |

The pH of the fermentation medium is 7.5.

Culturing is carried out at 30° C. for 4 days with aerobic shaking of the culture, resulting in the formation of 39.5 mg./ml. of L-lysine (as the hydrochloride) in the resultant culture liquor.

Only 34.5 mg./ml. of L-lysine is formed in the fermentation liquor when a homoserine-and leucine-requiring strain of *Corynebacterium glutamicum* (ATCC 21253) is used and is cultured in a manner similar to that described above as a control.

When culturing is carried out in a fermentation medium into which 500 μg./ml. of L-threonine has been added, 32.5 mg./ml. of L-lysine is formed with *Corynebacterium glutamicum* BL–25 ATCC 21526, whereas 10.0 mg./ml. of L-lysine is formed using *Corynebacterium glutamicum* ATCC 21253.

EXAMPLE 2

*Brevibacterium flavum* LT–1 ATCC 21528, a strain having a requirement for threonine and a resistance to the lysine analogue S-(β-aminoethyl)-cysteine and the threonine analogue α-amino-β-hydroxyvaleric acid, is used as the seed strain. Culturing is carried out under the same conditions of cultivation as described in Example 1, except that 200 μg./l. of thiamine is added to the seed culture medium and the fermentation medium described in Example 1, respectively. After the completion of culturing, 25 mg./ml. of L-lysine (as the hydrochloride) is found to be accumulated in the culture liquor.

When the threonine-requiring strain *Brevibacterium flavum* ATCC 21129 is used and is cultured in a similar manner as a control, only 17 mg./ml. of L-lysine is formed in the culture liquor.

EXAMPLE 3

*Cornebacterium glutamicum* RL–9 ATCC 21543, a strain having a requirement for homoserine and leucine and a resistance to the lysine analogue S-(β-aminoethyl)-cysteine, *Corynebacterium glutamicum* T–135 ATCC 21527, having a requirement for homoserine and leucine and a resistance to the threonine analogue α-amino-β-hydroxyvaleric acid, and *Corynebacterium glutamicum* LY–32–6 ATCC 21544, having a requirement for homoserine and leucine and a resistance to the isoleucine analogue 2-amino-3-methylthiobutyric acid, are used, respectively, as seed strains and are cultured in the same manner as described in Example 1. The amounts of L-lysine formed in the resultant fermentation liquor are given in Table 1.

TABLE 1

| Strains used: | Amount of L-lysine formed, mg./ml. |
|---|---|
| S - (β-aminoethyl) - cysteine - resistant strain ATCC 21543 | 39.4 |
| α-Amino-β-hydroxyvaleric acid-resistant strain ATCC 21527 | 38.2 |
| α - Amino - 3-methylthiobutyric acid-resistant strain ATCC 21544 | 38.1 |

EXAMPLE 4

*Brevibacterium flavum* T–301 ATCC 21529, a strain having a requirement for threonine and a resistance to the threonine analogue α-amino-β-hydroxyvaleric acid, is used as the seed strain. Culturing is carried out under the same condition of cultivation described in Example I, except that 200 μg./l. of thiamine is added to the seed culture medium and the fermentation medium described in Example 1, respectively. At the completion of cultivation, 30.1 mg./ml. of L-lysine (as the hydrochloride) is found to be accumulated in the culture liquor.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing L-lysine which comprises culturing an L-lysine-producing microorganism of *Brevibacterium flavum* having a requirement for threonine and a resistance to a feedback inhibition and/or repression of lysine, threonine or an analogue thereof, or of *Corynebacterium glutamicum* having a requirement for homoserine (or threonine plus methionine) and leucine and a resistance to a feedback inhibition and/or repression of lysine, threonine, isoleucine or an analogue thereof, under aerobic conditions in an aqueous nutrient medium containing said growth-requisite amino acids, and accumulating L-lysine in the resultant culture liquor.

2. The process of claim 1, wherein culturing is carried out at a temperature of about 20° to 40° C. and at a pH of about 4.0 to 9.5.

3. The process of claim 1, wherein an amount less than the optimum amount for the growth of the microorganism of the growth-requisite amino acid is employed in the medium.

4. The process of claim 1, wherein said lysine analogues, said threonine analogues and said isoleucine analogues are selected, respectively, from the group consisting of S-(β-aminoethyl)-cysteine, 5-hydroxylysine, 2,6-diaminoheptanoic acid, N-ε-formyllysine, trans-2,6-diamino-4-hexenoic acid, 2,6-diaminohexynoic acid, 2-amino-(β-aminoethoxy)-propionic acid, 3-aminocyclohexane alanine, 4-azalysine, 3-aminomethylcyclohexane glycine, α-amino - β - hydroxyvaleric acid, β-hydroxyleucine, norleucine, 2-amino-3-methylthiobutyric acid, α-aminobutyric acid, L-O-methylthreonine, ω-dehydroisoleucine, 3-cyclopentane-1-glycine, cyclopentane glycine, 2-cyclopentane-1-glycine, β-hydroxyleucine and methallyl glycine.

5. A process according to claim 1 wherein the microorganism is selected from the group consisting of *Brevibacterium flavum* LT-1 ATCC 21528, *Brevibacterium flavum* T-301 ATCC 21529, *Corynebacterium glutamicum* BL-25 ATCC 21526, *Corynebacterium glutamicum* T-135 ATCC 21527, *Corynebacterium glutamicum* RL-9 ATCC 21543 and *Corynebacterium glutamicum* LY-32-6 ATCC 21544.

6. The process of claim 5, wherein culturing is carried out at a temperature of about 20° to 40° C. and at a pH of about 4.0 to 9.5.

7. The process of claim 6, wherein an amount less than the optimum amount for the growth of the microorganism of the growth-requisite amino acid is employed in the medium.

References Cited
UNITED STATES PATENTS 3,524,797  8/1970  Woodruff et al. _____ 195—29

ALVIN E. TANENHOLTZ, Primary Examiner

U.S. Cl. X.R.

195—112, 47